United States Patent Office 3,563,832
Patented Feb. 16, 1971

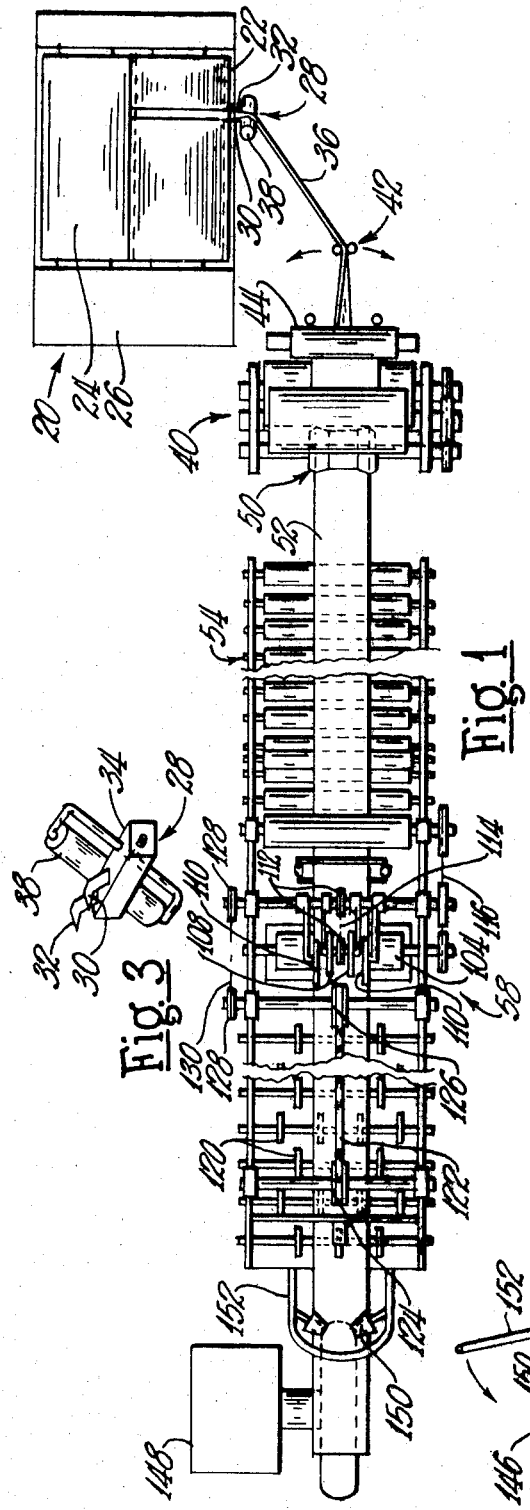

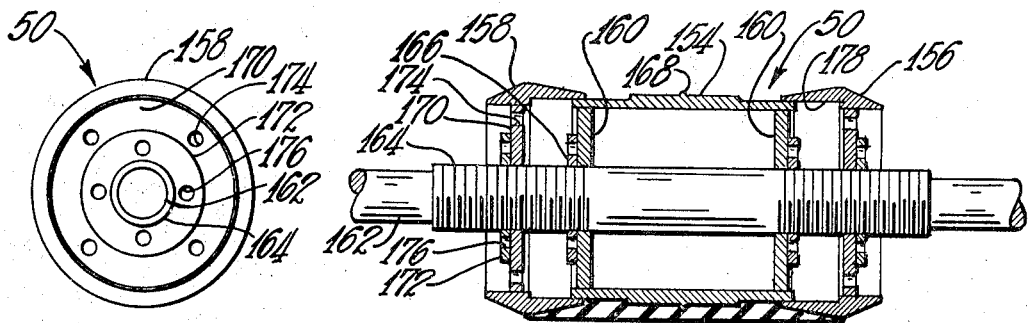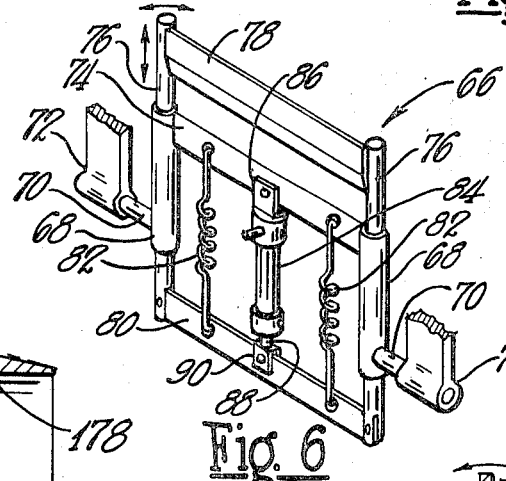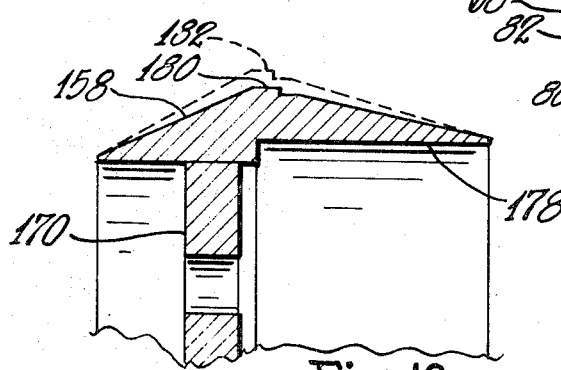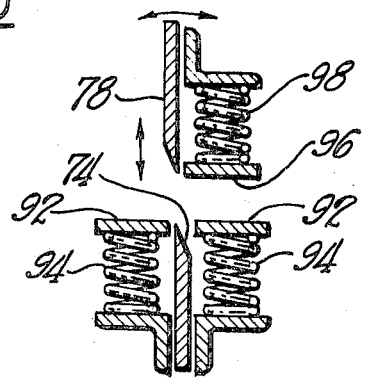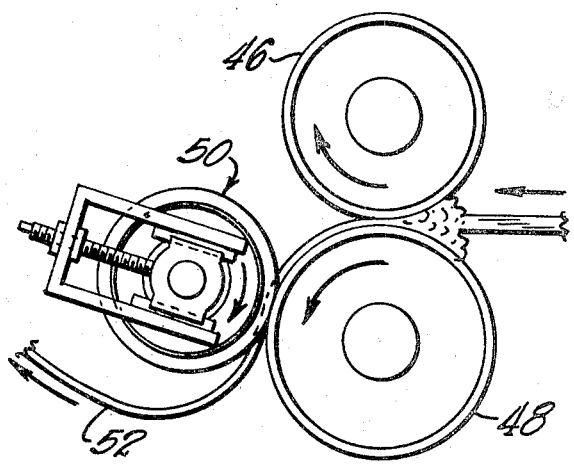

3,563,832
TIRE RETREADING APPARATUS WITH TREAD AND SIDEWALL FORMING ROLL
Donno W. Cooper, Muncie, Ind., assignor of one-third each to Darrell D. Cooper, Muncie, Ind., and Eugene Reed, Louisville, Ky.
Filed Dec. 4, 1967, Ser. No. 687,828
Int. Cl. B29h 17/37
U.S. Cl. 156—405                              13 Claims

ABSTRACT OF THE DISCLOSURE

Retreading of tires is accomplished with tread stock produced by a forming roll. The tread stock formed by the forming roll is applied to a tire carcass by a tire building machine, with the tread stock forming apparatus and tire building apparatus constituting one retreading unit. With this arrangement, it is no longer necessary to purchase tread stock from outside sources, which stock is relatively expensive and may be of non-uniform, lower quality. Roll-forming of the tread stock requires relatively inexpensive apparatus and the start-up time involved is relatively short. The forming roll used for the tread stock also is adjustable and can be relatively quickly adjusted for various sizes of tread stock including widths and thicknesses.

---

This invention relates to a method and apparatus for retreading tires and specifically with roll-formed tread stock.

In the usual technique for retreading tires, retreaders purchase tread stock from rubber manufacturers with the tead stock obtained in various widths and thicknesses for a wide variety of tire sizes. Since a number of different sizes of tread stock are needed, a relatively large supply is involved. This means a relatively large inventory cost and, further, the tread stock has a limited shelf life of perhaps six months. More important, perhaps, is the fact that the quality of the tread stock may vary, not only from manufacturer to manufacturer but even from a given manufacturer. The quality of the tread stock is often lower than that desired and may not meet the tensile tests required, for example.

The present invention involves a method and apparatus for producing retreaded tires in which the tread stock is not purchased as a semi-finished product but, rather, raw rubber is obtained from rubber manufacturers and this rubber is compounded and formed into tread stock which is then fed to a tire rebuilding machine. Raw rubber of an exact known quality thus can be obtained from rubber manufacturers and additives of a particular quality and quantity can be added to complete the tread stock rubber supply. The tread stock roll-formed with this rubber is not only of more uniform and perhaps higher quality but also is substantially less expensive than the usual tread stock. There is no need to stock a wide variety of sizes of relatively expensive tread stock and there is no problem with possible exhausted tread stock supplies since the tread stock can be made to any specific size at the time of retreading. Further, the tread stock formed in accordance with the invention does not have a layer of cushion gum rubber on the back face as is true with preformed tread stock, which layer sometimes constitutes a weak link between the tread stock and the tire carcass.

By roll-forming the tread stock, the apparatus required is relatively inexpensive as compared with extrusion apparatus, for example, and the start-up time is relatively short. Also, less energy is required and temperatures of the rubber being worked are lower than in extusion processes.

The invention also provides a unique tread stock forming roll which is capable of producing tread stock in various widths with a minimum time and labor involved in adjustment. The forming roll also can be employed to produce tread stock of various thicknesses by changing certain portions of the roll.

In roll forming, the rubber can be taken off a rubber mill in a narrow strip at a rate much faster than the rate at which the tread stock strip is formed, with the narrow strip then gathered into a pile and fed between a pair of supply rolls where it is flattened and formed by a forming roll in contact with one of the supply rolls. This enables the rubber to be removed in a relatively small volume and yet at a high lineal rate from the mill and to cool somewhat before being formed, with the supply rolls being heated or cooled as desired, if necessary, immediately prior to the forming, to achieve the proper forming temperature.

It is, therefore, a principal object of the invention to provide a method and apparatus for roll forming rubber having the advantages discussed above.

Another object of the invention is to provide an improved method and apparatus for retreading tires with roll-formed tread stock.

Many other objects and advantages of the invention will be apparent from the following detailed description of a preferred embodiment thereof, reference being made to the accompanying drawings, in which:

FIG. 1 is a schematic overall plan view of apparatus embodying the invention;

FIG. 2 is a side view in elevation of the apparatus of FIG. 1;

FIG. 3 is a perspective view of a rubber stripper shown in FIG. 1;

FIG. 4 is a side view in elevation on an enlarged scale of supply and forming rolls for producing the tread stock;

FIG. 6 is view in perspective of a cut-off device for the tread stock;

FIG. 7 is an enlarged fragmentary sectional view of portions of the cut-off device of FIG. 6;

FIG. 8 is a greatly enlarged, detailed view in longitudinal, vertical section of a forming roll for producing the tread stock in accordance with the invention;

FIG. 9 is an end view of the forming roll of FIG. 8; and

FIG. 10 is an enlarged, sectional view of a component of the forming roll of FIG. 8.

Figure 5:
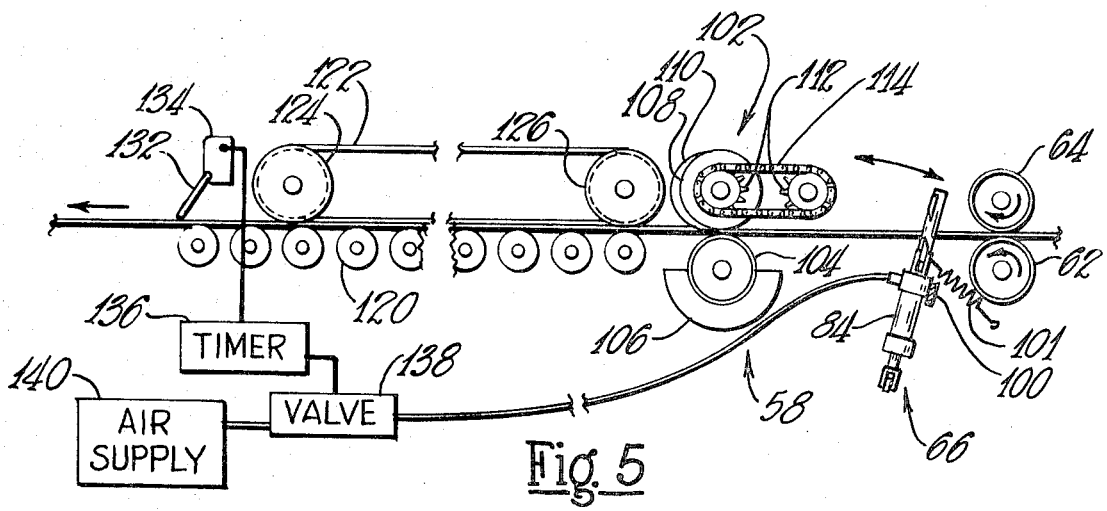
FIG. 5 is an enlarged side view in elevation of part of the apparatus of FIG. 2 and further schematically showing certain controls.

The overall roll forming and retreading apparatus will first be discussed with reference to FIGS. 1 and 2. Raw rubber and chemical additives of a predetermined composition are supplied to a rubber mill 20 which can be of a suitable commercial design. In a usual form, the raw rubber is supplied in a ninety-pound block which is fed between a pair of mixing rolls 22 and 24 which are driven in opposite directions by a heavy-duty power unit 26. The rolls are driven in opposite directions with the front roll 22 driven at a speed causing the rubber to wrap around this roll rather than the rear roll 24. As the block of rubber is broken down, the additive, such as three pounds of a pre-mixed powdered batch, is added between the rolls and mixed into the rubber with the entire compounding operation requiring in the order of fifteen minutes, during which time the rubber, due to the mixing and internal friction, reaches an elevated temperature, such as 215°–230° F.

In order to supply the proper amount of rubber from the roll 22 for forming the tread stock and to enable it to reach a proper roll forming temperature, the rubber is removed from the front roll 22 in a narrow strip by a stripper 28 (FIG. 3). This consists of a pair of knife blades or cutters 30 and 32 which cut the layer of rubber on the roll 22 and are spaced apart a predetermined distance to enable a particular width of rubber to be stripped from the rolls. The rubber layer on the rolls has a constant thickness as determined by the spacing between the rolls 22 and 24 so that the amount of rubber stripped therefrom can be readily controlled by the knife blade spacing. The blades 30 and 32 are held on a suitable support 34 with a rubber strip 36 removed therefrom and fed around an idler roll 38 to a cold forming unit indicated at 40.

The narrow strip of rubber is gathered in a random pile or collection by a level wind device 42 and a pair of feed rolls 44 which provide the force for removing the narrow strip 36 of rubber from the mill. From the collected pile, the strip is fed between a mixing roll 46 and a supply roll 48 where it is mixed further and then flattened to pass between the supply roll 48 and a forming roll 50 to be discussed in detail subsequently. The mixing and supply rolls 46 and 48 can be about six inches in diameter with the bottom roll driven at 5½ r.p.m. and the top roll driven slightly faster to obtain better mixing and flattening of the strip 36. The rubber preferably is at a temperature of about 150° F. when reaching the forming roll 50. The rolls 46 and 48 can be water-cooled or heated, if necessary, to achieve the desired temperature of the rubber under the particular circumstances.

A resulting tread stock strip 52 is moved around the forming roll 50 and onto a conveyor 54 on which the tread stock strip can be cooled to a temperature of approximately 125° F. The conveyor 54 can be of any suitable design and can have a blower 56 therebelow which increases the cooling rate of the rubber, if necessary. In some applications, the conveyor may not be needed at all, particularly if the rate of movement of the formed tread stock strip 52 is slow and the environment is relatively cool.

The tread stock strip 52 is then carried onto a conveyor indicated at 58 (FIGS. 1, 2, and 5) upon which adhesive is applied to the tread stock strip and it is cut to a predetermined length. The strip 52 first is carried over an idler roll 60 and is then fed between a pair of drive rolls 62 and 64 and through a cut-off device 66 which severs the strip when actuated. As shown in FIGS. 6 and 7, the cut-off device 66 is of a travelling type and includes a pair of tubular upright side supports or members 68 which are pivotally supported by axles 70 to bearing members 72 of the frame of the conveyor 58. A lower knife blade 74 extends between and is affixed to upper portions of the tubular supports 68. A pair of supporting rods or slidable members 76 are slidably held in the tubular supports 68 for movement longitudinally thereof, with an upper knife blade 78 extending between the supporting rods 76 and positioned in general alignment with the blade 74, but with the cutting edge designed to move slightly below the cutting edge of the blade 74 when the two move into cutting relationship. A transverse supporting bar 80 extends between the lower ends of the supporting rods 76 with springs 82 connected between the lower knife blade 74 and the bar 80 to urge the upper knife blade 78 in an upward direction.

A pneumatic cylinder 84 is connected by ears 86 to the blade 74 and has a piston rod 88 pivotally connected by an ear member 90 to the bar 80. When the piston rod 88 is extended, the bar 80 is moved downwardly and correspondingly moves the upper knife blade 78 downwardly into cutting relationship with the lower blade 74. Upon release of pressure in the cylinder 84, the springs 82 return the upper knife blade 78 to the upper position.

As shown in FIG. 7, a pair of pressure plates 92 can be located on each side of the lower knife blade 72 and urged upwardly by springs 94 to prevent the rubber strip from sticking to the blade after being cut. An upper pressure plate 96 similarly urges the forward edge of the cut strip away from the upper blade 78 by a spring 98. The plates 92 and 96 are, of course, depressed by the rubber strip as the blades 74 and 78 move into cutting relationship.

The cut-off device 66 is freely mounted for pivotal movement so that when the blades come together and cut the strip, the entire device swings in an arcuate manner in the direction of travel of the strip until the blade 78 moves upwardly again and the blades are freed from the strip by virtue of the pressure plates. At that time, the cut-off device 66 is pivoted back to its original position against a stop 100 (FIG. 5) by means of a return spring 101.

After the strip 52 progresses through the cutoff device 66, a lower surface of the strip receives a coating of adhesive by virtue of a coating applicator unit 102. This includes a coating roller 104 partially immersed in a coating material reservoir or trough 106. As shown in FIG. 2, two driven inner pressure discs 108 and two idler pressure discs 110 are located above the roller 104 and engage the central and outer portions of the strip 52 to maintain it fully in contact with the roller 104 when adhesive is applied thereto. The two inner discs 108 are driven through a pair of sprockets 112 and a chain 114. The drive sprocket of the pair 112 along with the roller 104 and the feed roll 62 are driven through a chain 116 and a drive sprocket 118, as shown particularly in FIGS. 1 and 2.

After being severed and coated, the strip 52 is carried along the conveyor 58 on thin idler wheels 120 with the strip being moved by virtue of a belt 122, such as a V-belt, extending between an idler pulley 124 and a driven pulley 126 powered through sprockets 128 and a chain 130 (FIG. 2). This provides the motivating power for the strip after leaving the cut-off device. A blower assembly 131 can be used below the idler wheels 120 to cool the strip or dry the adhesive.

The leading edge of the severed strip 52 then engages a trigger 132 (FIG. 5) which closes a microswitch 134. The switch 134 causes a timer 136 to be energized which opens a valve 138 for a short, predetermined period. Fluid, e.g. air, is then supplied from a source 140 to the cylinder 84 to cause the upper blade 78 to move downwardly and cooperate with the blade 74 to sever the strip. As the blades engage the strip, the device 66 pivots in a counterclockwise direction as the strip moves, until the severing operation is complete and the upper blade retracts and the pressure plates free the strip portions from the blades. The trigger 132 can be adjustably mounted for movement longitudinally of the conveyor 58 to adjust the length of the severed strip 52, the length being determined by the distance between the cut-off device 66 and the trigger 132.

After the strip is coated and severed, it continues to move forwardly and is applied to a prepared tire carcass 142 (FIGS. 1 and 2) aligned with the strip and mounted on a hub 144 of a commercially available tire building machine indicated at 146, with the hub being driven through a drive arrangement and controls in a housing 148. The hub rotates the carcass to apply the strip thereto with the coated side adjacent the carcass. The strip is then trimmed further and the ends connected in abutting relationship. The strip is then firmly adhered to the carcass by means of stitching rollers 150 which are resiliently and rotatably mounted on a frame 152 which is swung downwardly by the operator as the carcass is rotated to be pressed against the strip and firmly force it into contact with the tread portion and the sidewall portion of the tire carcass. The combination carcass and strip are then removed from the hub 134 and vulcanized in the usual manner.

The forming roll for the tread stock, as shown in more detail in FIGS. 8–10, is of a predetermined shape to provide the proper cross section for the tread stock strip, when rotating in engagement with the supply roll 48. The forming roll 50 can be of a three-part construction to enable tread stock strips of different widths to be formed. The forming roll includes a central, generally cylindrical, part 154 which forms the tread section of the tread stock strip, and two tapered end parts 156 and 158 which form the sidewall portions of the tread stock strip, as shown in transverse cross section at the lower surface of the forming roll in FIG. 8. The cylindrical central part 154 has a pair of end walls 160 through which extend an axle 162 having threaded portions 164. Lock nuts 166 are located on the threaded portions 164 and are tightened against the end walls 160 of the central part 154 to hold it in place. The contour of the cylindrical part 154 includes a central annular ridge 168 which forms a small groove extending longitudinally of the tread stock strip which aids in centering the tread stock strip relative to the tire carcass.

The tapered end parts 156 and 158 are substantially identical, including transversely extending walls 170 which are threaded onto the threaded portions 164 and held in predetermined positions by lock nuts 172. The walls 170 have diametrically opposite openings 174 to receive a large spanner wrench while the lock nut 172 also has openings 176 to receive a smaller spanner wrench, with these wrenches enabling the lock nuts 172 to be tightened securely against the walls 170 to hold the tapered end parts 156 and 158 in any predetermined position. The tapered end parts 156 and 158 include shallow annular recesses 178 which fit over the end portions of the central part 154 and telescope therewith, forming uniform junction lines.

The overall width of the tread stock strip is determined by annular ridges 180 (FIG. 10) at the thicker portion of the end parts 156 and 158 with the ridges bearing against the rubber supply roll 48 to separate the rubber supply forming the tread stock strip from the outer portions which continue on around the roll 48 and once again are mixed with newly-supplied rubber and continue to move around the forming roll 50.

With this arrangement of the tapered end parts, it is relatively simple to loosen the lock nuts 172 and turn the tapered end parts 156 and 158 in or out relative to the central part and thereby readily adjust the width of the tread stock strip 52 to enable the strip to accommodate tires of various widths with a matter of an adjustment which requires a few minutes at the most. Hence, numerous sizes of tires can be accommodated without requirement of employing substantial stocks of tread stock strips or a large variety of sizes of apparatus.

For forming thicker tread stock, such as that employed for certain snow tires, slightly thicker end parts, represented by dotted lines 182 in FIG. 10, can be employed in place of the end parts 156 and 158, simply by loosening the lock nuts 172 and unscrewing the end parts 156 and 158, substituting the thicker end parts 182. The forming roll 50, in this instance, is adjustable on its frame to be moved slightly further away from the supply roll 48 when the thicker end parts are employed, but with the ridges 180 still in contact with the roll 48. For larger production, two separate forming rolls 50 can be used, one with the end parts 156 and 158 and the other with the end parts 182. This facilitates changing of the rolls since the end parts need not be unthreaded and the new end parts assembled. In a particular instance, the end parts 156 and 158 are employed to form eleven-gauge tread stock strips whereas the end parts 182 form fourteen-gauge tread stock strips.

Various modifications of the above described embodiment of the invention will be apparent to those skilled in the art, and it is to be understood that such modifications can be made without departing from the scope of the invention, if they are within the spirit of the accompanying claims.

I claim:

1. Apparatus for retreading tires comprising a rubber supply roll, a forming roll positioned adjacent said supply roll, said forming roll including a tread portion and two sidewall portions for forming tread stock, said forming roll comprising a central, generally cylindrical part for forming the tread portion of the tire stock, and two end parts for forming sidewall portions of the tread stock, said end parts extending beyond said central part, at least one of said end parts being movable with respect to said central part to vary the width of the tread portion of the tread stock being formed, with the space defined between said supply roll and said forming roll being similar in shape to the shape of such tread stock to be applied to a tire carcass, whereby such tread stock has a substantial cross section when it leaves said forming roll, a tire building machine for facilitating application of such tread stock to the tire carcass, and means for directing the tread stock formed between said forming roll and said supply roll toward said machine.

2. Apparatus according to claim 1 characterized by means for applying adhesive to the bottom surface of the thread stock prior to it reaching said machine.

3. Apparatus according to claim 1 characterized by means for automatically cutting the tread stock to a predetermined length prior to it reaching said machine.

4. Apparatus accordin to claim 1 characterized by said forming roll having an annular central portion and two adjustable end portions movable toward and away from one another to form tread stock of different widths.

5. Apparatus according to claim 1 characterized by means for feeding rubber to said rubber supply roll and comprising a rubber mill, means for removing a narrow strip of rubber from a roll of said rubber mill and for feeding the narrow rubber strip to said supply roll at a rate in excess of the rate at which the rubber tread stock strip is formed.

6. Apparatus according to claim 5 characterized by an additional roll located in generally predetermined relationship with respect to said supply roll with said narrow strip supply means directing the narrow strip between said additional roll and said supply roll.

7. Apparatus according to claim 1 characterized by means for cooling the tread stock between said forming roll and said tire building machine.

8. In an apparatus for retreading tires including a rubber mill and a tire building machine, the invention comprising, in combination, a forming roll for producing tread stock positioned between the rubber mill and the tire building machine, said forming roll including a tread portion and two sidewall portions for retreading tires, said forming roll comprising a central, generally cylindrical part for forming the tread portion of the tread stock, and two end parts for forming sidewall portions of the tread stock, said end parts extending beyond said central part, and means for enabling at least one of said end parts to be moved in and out with respect to said central part to vary the width of the tread portion of the tread stock being formed.

9. A forming roll according to claim 8 wherein said end parts taper in thickness toward said central part.

10. A forming roll according to claim 8 wherein said central part and said end parts of said forming roll are mounted on a single axle and both of said end parts can be moved in and out on said axle with respect to said central part.

11. A forming roll according to claim 10 wherein said end parts of said forming roll are threadedly engaged with said axle and can be moved in and out with respect to said central part.

12. A forming roll according to claim 11 characterized further by lock means associated with said axles for locking said end parts in any given position with respect to said central part.

13. A forming roll according to claim 8 wherein said end parts have annular edges which fit over the outer edges of said central part for any given operable position of said end parts with respect to said central part.

References Cited

UNITED STATES PATENTS

| | | | |
|---|---|---|---|
| 2,009,599 | 7/1935 | Woock | 159—96 |
| 3,026,230 | 3/1962 | Nebout | 156—405X |
| 3,170,499 | 2/1965 | Deist | 156—130X |
| 3,407,106 | 10/1968 | Barefoot | 156—96X |

BENJAMIN A. BORCHELT, Primary Examiner

S. C. BENTLEY, Assistant Examiner